United States Patent Office

3,136,599
Patented June 9, 1964

3,136,599
PLUTONIUM RECOVERY FROM NUCLEAR FUEL
Raymond H. Moore, Kennewick, Wash., assignor to the United States of America as represented by the United States Atomic Energy Commission
No Drawing. Filed July 25, 1962, Ser. No. 212,495
6 Claims. (Cl. 23—14.5)

This invention deals with the recovery of plutonium from plutonium-aluminum alloys as they are used in nuclear reactors as spike fuel elements together with basic ceramic-type uranium dioxide-plutonium dioxide fuel elements, for instance, in the plutonium recycle test reactor.

The ceramic-type oxidic fuel elements and materials just mentioned are often processed by the so-called salt cycle process described in U.S. Patent No. 3,011,865, granted on December 5, 1961, to Glen E. Benedict and Ward L. Lyon. This process involves dissolution of oxidic-type fuel materials in a molten salt solvent and electrolytic recovery of uranium dioxide and/or uranium dioxide-plutonium dioxide mixtures.

The salt cycle process is not operative for metallic plutonium-aluminum spike fuel. It is necessary, though, mainly for economic reasons, to recover the plutonium also from the metallic spike fuel elements.

It is an object of this invention to provide a process of extracting plutonium from plutonium-aluminum fuel which results in an almost quantitative recovery.

It is also an object of this invention to provide a process of recovering plutonium from plutonium-aluminum fuel that is very simple.

It is finally also an object of this invention to provide a process for plutonium recovery from plutonium-aluminum alloys that operates with a high degree of economy.

It has been found quite unexpectedly that molten lithium chloride has great affinity to plutonium trichloride, that this affinity is considerably greater than that of molten potassium chloride-aluminum chloride to plutonium trichloride and that therefore the lithium chloride extracts plutonium trichloride from potassium chloride-aluminum chloride mixtures to a high degree.

It has also been found that, when lithium chloride, potassium-aluminum double chloride and the aluminum-plutonium spike fuel to be treated are melted together, three distinct phases are obtained, namely a heavy aluminum phase, an intermediate lithium chloride extractant phase containing the bulk of the plutonium and a light phase of potassium-aluminum "double chloride."

The process of this invention is based on these findings. It comprises adding lithium chloride to an about equimolar double chloride of potassium and aluminum; adding the aluminum-plutonium alloy to be treated to the chlorides; heating the reaction mass to above melting temperatures; agitating the reaction mass while molten for thorough contact and reaction; allowing the mass to separate into three phases; and removing a plutonium-containing lithium chloride phase from an aluminum phase and a double-chloride phase.

Instead of the lithium chloride extractant, other chlorides that are not reduced by aluminum can be used. For instance, calcium chloride, barium chloride, strontium chloride and magnesium chloride do not react with aluminum and have a greater affinity to the plutonium trichloride than have the double chlorides.

The double chlorides and lithium chloride are not completely immiscible; from 2.5 to 5% of potassium-aluminum double chloride, for instance, is usually taken up by the lithium chloride at 600 and 700° C., respectively.

The quantities of extractant chloride and double chloride may vary widely. Of course, the double chloride has to be present in a quantity excessive of that necessary for the chlorination of plutonium so that enough of it is available after reaction for the formation of a separate phase and easier isolation of the lithium chloride. Lithium chloride or its substitute chloride extractants must be present in a quantity sufficient to take up all of the plutonium trichloride formed.

The preferred operating temperature is within the range of between 700 and 800° C.

Since the lithium chloride contains only half the amount of double chloride at 600° C. as it does at 700° C., it is advantageous to cool the mass after reaction and before phase separation to about 600° C.; a more complete separation of the lithium or other chloride from the double chloride is then accomplished.

Phase separation can be carried out by any means known to those skilled in the art. Removal by "bottom-pouring," that is by first withdrawing the heaviest layer and thereafter the intermediate layer, was one of the preferred methods.

The extraction of the plutonium trichloride into the lithium or other chloride extractant is not quantitative; the double chloride always contains a small quantity of plutonium chloride after the reaction, usually in the order of between 5 and 10% by weight of the quantity originally added. This plutonium content of the double salt, however, is not serious and does not represent a loss, because the salt is recycled into the process so that the losses occur actually only once, the last time each batch of salt is used.

The lithium chloride or other chloride extractant containing the bulk of the plutonium in the form of the trichloride is processed further for the isolation and recovery of the plutonium; this can conveniently be done in the above-mentioned salt cycle process. It is not part of this invention.

While the invention is primarily intended for the processing of plutonium-aluminum alloys, it is also applicable to other chlorinatable compounds, such as oxidic fuel material.

In the following, two examples are given to illustrate the process of this invention.

*Example I*

A piece of binary aluminum-plutonium alloy weighing 7.524 grams and containing 1.25% by weight of plutonium was added to a salt system consisting of 10.5 grams of lithium chloride and 26.4 grams of equimolar potassium chloride-aluminum chloride. The salts had a temperature of 700° C. Contact of the salts with the alloy was improved by shaking and was maintained for about 50 minutes.

After this period of reaction and equilibration, the phases were cooled for solidification and analyzed for their plutonium contents. The lithium chloride was found to contain 92.0% by weight of the plutonium added in the form of the alloy, the double chloride 7.7%, and the aluminum was found to have retained 0.30% of the plutonium.

The following example shows that the presence of uranium does not impair the plutonium extraction by the process of the invention.

*Example II*

A mixture of plutonium dioxide-uranium dioxide weight ratio 1:5, was dissolved in molten $KAlCl_4$, and the salt mixture was equilibrated with lithium chloride and aluminum, as described in Example I. Reaction time, temperature and other conditions were the same as those used in Example I.

After the extraction the lithium chloride was found to contain 96.1% of the plutonium, the double chloride 3.70% and the aluminum 0.19%.

It will be understood that the invention is not to be limited to the details given herein but that it may be modified within the scope of the appended claims.

What is claimed is:

1. A process of recovering plutonium from chlorinatable nuclear fuel, comprising adding a salt selected from the group consisting of lithium chloride, calcium chloride, barium chloride, strontium chloride, and magnesium chloride to an alkali metal-aluminum double chloride; adding said fuel and adding aluminum to the chloride mixture obtained; heating the reaction mass thus obtained to above melting temperature; agitating the reaction mass while molten for thorough contact and reaction; allowing the mass to separate into three phases; and removing a plutonium-containing phase from an aluminum phase and a double chloride phase.

2. The process of claim 1, wherein the alkali metal-aluminum double chloride is potassium-aluminum chloride, the salt is lithium chloride, and the double chloride is of about equimolar composition.

3. The process of claim 2 wherein the temperature is maintained at between 700 and 800° C. during reaction.

4. The process of claim 3 wherein the mass, before phase separation, is cooled to about 600° C.

5. The process of claim 2, wherein said fuel and aluminum are added in the form of a plutonium-containing aluminum alloy.

6. The process of claim 2, wherein said fuel is a uranium dioxide-plutonium dioxide mixture and the aluminum is added separately.

References Cited in the file of this patent

UNITED STATES PATENTS

| | | |
|---|---|---|
| 2,948,586 | Moore | Aug. 9, 1960 |
| 2,968,547 | Lyon et al. | Jan. 17, 1961 |
| 3,057,717 | Moore | Oct. 9, 1962 |